US000001886H

United States Statutory Invention Registration [19]

[11] Reg. Number: H1,886

Klemm et al.

[45] Published: Oct. 3, 2000

[54] OPTICAL THIN-FILM CAVITIES FOR TRANSDUCING VISIBLE RADIATION TO INFRARED RADIATION

[75] Inventors: Karl A. Klemm, Largo, Fla.; Robert Z. Dalbey, Ridgecrest, Calif.

[73] Assignee: The United States of America as represented by the Secretary of the Navy, Washington, D.C.

[21] Appl. No.: 08/937,286

[22] Filed: Sep. 15, 1997

[51] Int. Cl.[7] ..... G02B 6/06

[52] U.S. Cl. ..... 385/119

*Primary Examiner*—Daniel T. Pihulic

*Attorney, Agent, or Firm*—Stephen J. Church; Melvin J. Sliwka

[57] ABSTRACT

A transducer is deposited on each fiber of an optical fiber scene projector to convert portions of electromagnetic radiation to emitted radiation, such as IR. The transducer, is adaptable to large arrays of optical fibers and can be fabricated using mature conventional processes, such as vapor deposition, for example. The components of the transducer can be tailored to handle different incident radiation and produce desired emitted radiation. Dielectric layers having thicknesses equal to odd-numbered multiples of quarter wavelengths of the electromagnetic radiation receive the electromagnetic radiation and a reflector adjacent to the layers reflects unabsorbed portions of radiation back through the layers. An absorber layer interposed between adjacent dielectric layers absorbs the received and the reflected radiation so as to convert the absorbed radiation into heat energy. Second dielectric layers having thicknesses equal to odd-numbered multiples of quarter wavelengths of desired emitted radiation are deposited adjacent to the reflector. A second absorber layer interposed between the adjacent layers of the second dielectric layers absorbs the heat energy and converts it to the emitted radiation, such as IR, although, other wavelengths could be emitted depending on the dimensions and materials used. Different number of layers may be included as needed to modify the emitted radiation.

14 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

OPTICAL THIN-FILM CAVITIES FOR TRANSDUCING VISIBLE RADIATION TO INFRARED RADIATION

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The most mature technologies for IR scene generation can be classified into three categories: thermal emitter arrays, spatial light modulators, and laser-based projection systems.

Thermal emitter arrays are those scene generators which are based on individually addressable resistively heated arrays. The inherently low emissivities of the semiconductor/metal materials used in these devices reduce the effective black body temperature for any given pixel. The low emissivities are compensated for by higher drive currents that produce the higher temperatures necessary to achieve a desired emittance. However, increased temperatures lead to increased thermal loads that reduce the maximum speed at which the generator may change scenes. Thermal cross talk between adjacent pixels is also increased leading to a reduction in spatial resolution.

Spatial light modulators are devices which spatially modulate incident radiation from IR sources. They include liquid crystal modulators, metallic gratings, and deformable mirror arrays that are typically wavelength limited and, consequently, perform poorly in the IR band. Work is progressing in this area but emphasis is on new materials and processes that are unlikely to compete cost-wise with the thin-film cavity approach of this invention that relies on mature optical technologies.

Laser-based projection systems used steered laser beams to write images directly on the imaging detector array. This technology requires high intensity laser sources that are modulated so the cumulative energy which arrives at each detector pixel is equivalent to that which would come from all the natural scene being modeled. The spatial resolution, thermal resolution, and frame rate of the laser system all depend on the controller which drives the position of the laser beam as a function of time. Such controllers are expensive and software maintenance is a prime concern. While these devices meet very specialized needs, their cost and complexity limit their application.

Thus, in accordance with this invention, a need was discovered in the state-of-the-art for cost effective multi-layered thin-film transducers for arrays of optical fibers that convert electromagnetic radiation, such as visible light, into IR emission.

SUMMARY AND OBJECTS OF THE INVENTION

The present invention is directed to providing a transducer of electromagnetic radiation. The electromagnetic radiation is received by first dielectric layers that have thicknesses equal to odd-numbered multiples of quarter wavelengths of the received radiation. A reflector adjacent to the layers reflects portions of the radiation back into the layers. A first film interposed between adjacent dielectric layers absorbs the received and reflective radiation and converts the absorbed radiation into heat energy. Second dielectric layers adjacent to the reflector receive the heat energy. Each layer of the second dielectric layers has a thickness equal to odd-number multiples of quarter wavelengths of desired radiation. A second film interposed between adjacent second dielectric layers absorbs the heat energy and converts it into emissions of the desired radiation.

An object of the invention is to provide am optical thin-film structure, or optical cavity, that absorbs and emits in different wavelengths of radiation.

Another object is to provide an optical thin-film structure that converts or transduces incident visible radiation into infrared radiation.

Another object is to provide a transducer which converts radiation from one IR band to another or from UV to IR.

Another object of the invention is to provide a cost-effective optical thin-film transducer structure deposited by mature production processes.

Still another object is to provide an optical thin-film transducer structure which provides structural and operational uniformity suitable for large optical arrays.

A further object is to provide an optical thin-film transducer structure for an infrared scene generator that effects improvements in efficiency, design, and operation.

These and other objects of the invention will become more readily apparent from the ensuing specification when taken in conjunction with the appended claims and drawings.

DESCRIPTION OF THE PREFERRED EMBODIMENT

Figure 1:
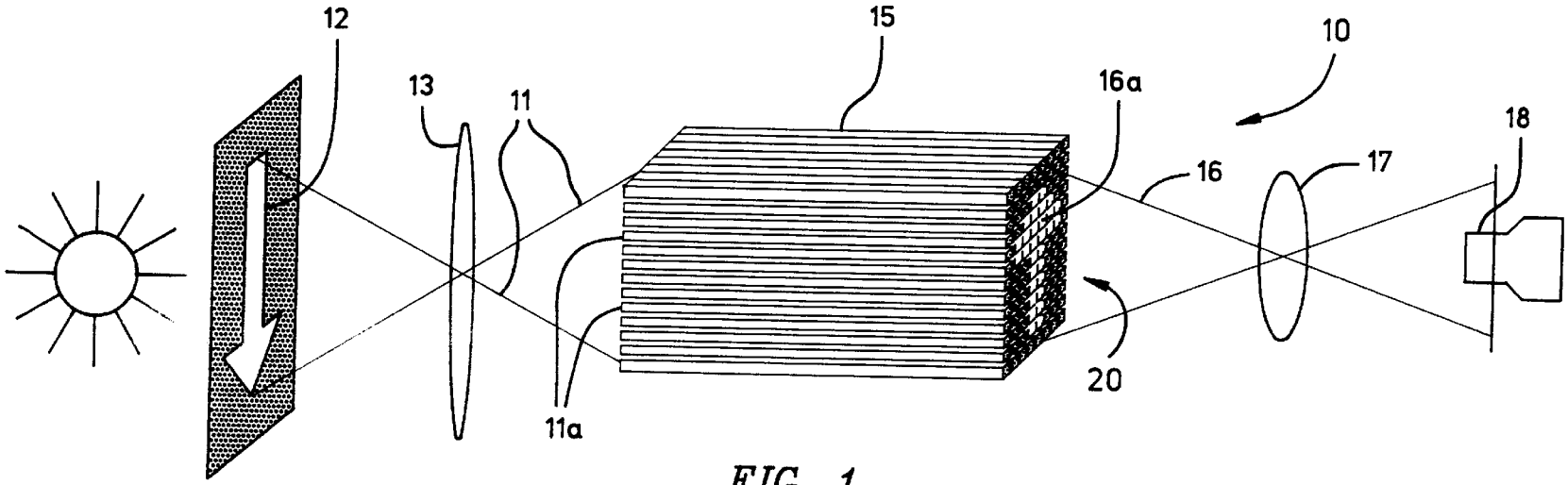
FIG. 1 is an isometric depiction of an infrared scene projector including the optical thin-film transducers of this invention.

Referring to FIG. 1, scene projector 10 receives electromagnetic radiation 11 that represents object 12. Electromagnetic radiation 11 that is focussed on the projector by lens 13 can be that portion of the electromagnetic spectrum commonly referred to light, which is made up of infrared light, visible light, and ultraviolet light. For that matter, the electromagnetic radiation that could be processed by the transducer of this invention also might include the xray to microwave portion of the electromagnetic spectrum.

Electromagnetic radiation 11 is transmitted in discrete portions 11*a* through an array of a plurality of spaced apart waveguides 15, such as optical fibers. Each optical fiber 15 transmits portion 11*a* of incident electromagnetic radiation 11 by total internal reflection to a separate transducer 20 that is each mounted on the end of a different one of each of the fibers. Each of the interconnected optical fibers and transducers preferably is spatially separated from other interconnected optical fibers and their transducers to provide thermal isolation from one another, which reduces the possibility of thermal distortion. Appropriate spacers and/or thermally isolating filler is inserted between the fibers to appropriately separate them in accordance with well known practices by those skilled in the art. radiation, convert them to heat energy and emit discrete portions of image radiation 16. The array of optical fibers 15 and their transducers 20 of projector 10 function as a multitude of pixels emitting radiation 16 that is representative of an image 16*a* of object 12. Since the temperature of any one pixel increases in proportion to the intensity of the source radiation arriving at the transducer, the intensity of the resulting emitted radiation is proportional to the intensity of the source scene.

Emitted radiation 16 is transmitted through lens 17 and onto detector 18 for appropriate processing and/or utilization. Infrared, IR, or other spectral distributions of wavelengths of image radiation that are longer than electromagnetic radiation 11 may be emitted in a band that is compatible with user devices. The exact emission depends on the needs of the users and the components selected in the design of transducer 20.

Figure 2:
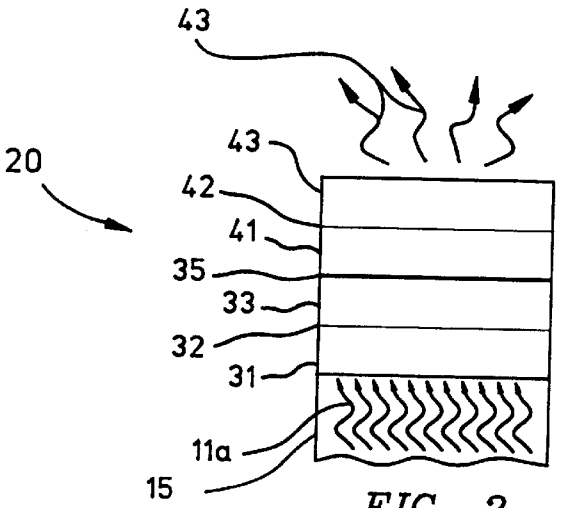
FIG. 2 schematically shows the optical thin-film transducer of the invention.

Referring to FIG. 2, each transducer 20 is fabricated on the end of a separate optical fiber 15 to receive portion 11*a* of the incident electromagnetic radiation 11. The fabrication process can either create transducers one at a time on individual fibers or create large arrays of transducers on large arrays of optical fibers simultaneously with substantial cost savings. In either case, each transducer 20 has an absorbing portion 30 and an emitting portion 40.

Absorbing portion 30 is deposited on the end of optical fiber 15. Absorbing portion 30 is designed to absorb electromagnetic radiation 11*a* and convert it to heat energy that is transmitted to emitting portion 40. Absorbing portion 30 has a dielectric layer 31 deposited on end of optical fiber 15, a thin-film absorber layer 32 deposited on dielectric layer 31, and another dielectric layer 33 deposited on thin-film absorber layer 32. A reflector layer 35 is deposited on dielectric layer 33. Reflective layer 35 has a first reflective side that reflects nonabsorbed portions of electromagnetic radiation 11*a* back through dielectric layer 33 and to thin metal absorber layer 32.

Emitting portion 40 is deposited adjacent absorbing portion 30. Emitting portion 40 is designed to absorb heat energy from absorbing portion 30 and to convert it to emitted radiation 44 in the form of IR or other predetermined radiation. Emitting portion 40 is made up of a second reflective side of reflector layer 35, a dielectric layer 41 deposited on reflector layer 35, a thin-film absorber layer 42 deposited on dielectric layer 41, and a dielectric layer 43 deposited on thin-film absorber layer 42.

Figure 3:
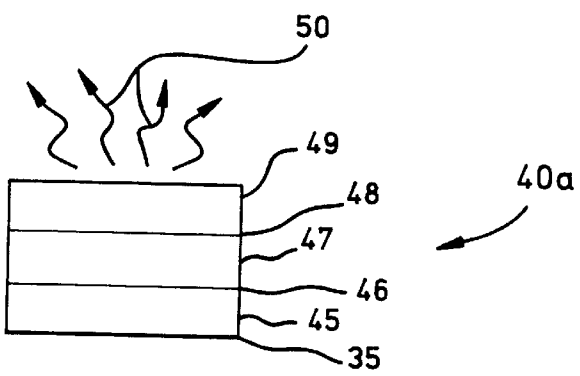
FIG. 3 is a variation of part of the optical thin-film transducer of the invention.

A variation of the emitting portion is shown in FIG. 3. Emitting portion 40*a* is deposited adjacent absorbing portion 30 on the second reflective side of reflector layer 35 (not shown in this figure). Emitting portion 40*a* is designed to absorb heat energy from absorbing portion 30 and convert it to emitted radiation 50 as IR or other predetermined radiation. Emitting portion 40*a* is made up of a second reflective side of reflector layer 35, a dielectric layer 45 deposited on reflector layer 35, a thin-film absorber layer 46 deposited on dielectric layer 45, a dielectric layer 47 deposited on thin-film absorber layer 46 a thin-film absorber layer 48 deposited on dielectric layer 47, and a dielectric layer 49 deposited on thin-film absorber layer 48.

It is to be understood that the terms dielectric layer, thin film absorber layer and reflector layer are thin films or coatings of dielectric or conductive materials deposited by any one or combinations of well known conventional optical coating processes freely available in the art. A typical fabrication process, for example, is the variety of vapor deposition techniques. The selected fabrication process can be tailored to provide for better thickness control than others, cost effectiveness, or risk reduction, to name a few. The end use application and the quality of the device being fabricated often determines which conventional process is selected. Fibers can be coated individually or coated as a group or array. Optionally, an optical blank may be coated then subsequently machined into a fiber array.

The material selected for the dielectric layers can be any suitable material (including air and vacuum) that acts as a dielectric for the wavelengths of the electromagnetic radiation or emitted radiation of interest. The dielectric material selected for the dielectric layers differs from material selected for the absorber layers and the reflector layers in that the dielectric layer materials have no free charges that can move through the material under the influence of an electric field. In dielectrics, all the electrons are bound; the only motion possible in the presence of an electric field is a minute displacement of positive and negative charges in opposite directions. The displacement is usually small compared to atomic dimensions.

The dielectrics have an index of refraction unique for the incident or emitted wavelengths of radiation. Consequently, the physical thickness of each dielectric layer in absorbing portion 30 is determined primarily by the wavelength of the impinging electromagnetic radiation 11 and the choice of dielectric, and the physical thickness of each dielectric layer in emitting portion 40 or 40 is determined primarily by the wavelength of emitted radiation 44 or 50 and the choice of dielectric. In other words, in addition to the index of refraction, the wavelength of the radiation being processed defines the dielectric spacer thickness, which is equal to odd-numbered multiples of one-quarter wavelengths of the radiation transmitted through the dielectric. For example, if the impinging electromagnetic radiation is light in absorbing portion 30, the quarter-wavelength thickness is for light so that the light reflected from reflector layer 35 undergoes a phase change of $\pi$ radians (180°). Since adjacent dielectric layer 33 is one quarter wavelength thick, this reflected light arrives back at the interface between dielectric layer 31 and absorber layer 32 exactly $\pi$ radians out of phase with the incoming ray of electromagnetic radiation 11 and destructive interference eliminates the reflection. The thicknesses of layers 31 and 33 can be greater but destructive interference occurs if the thicknesses are odd-numbered multiples of quarter-wavelengths of the light in dielectric layers 31 and 33. This quarter wave requirement also applies to the design for all subsequent dielectric layers in emitting portions 40 and 40*a* for essentially the same reason. However, it must be remembered that the quarter-wavelength thicknesses in the emitting portions are for the quarter wavelengths of the emitted radiation 44 or 50 (possibly IR) and not for the wavelengths of the incident electromagnetic radiation 11.

The material of the absorber layers typically is a good conductor for the wavelengths of the electromagnetic radiation or emitted radiation of interest. This means that many, if not all metals can be used and some of the new conducting polymers and other conducting materials might be used that are new and not well characterized at this point. A metal absorber layer is only a couple of atom layers thick (about 70Å–150Å). This metal-layer plane has a sheet resistance equal to half the impedance of air/vacuum/free/space. Thin metal films have sheet resistances equal to half the impedance of free space and absorb about 50% of the incident radiation. This feature of the invention in an application of contemporary electromagnetic antenna design. Free space has impedance or resistance that absorbs energy from electromagnetic radiation. Typically, the impedance of free space is a concern for radar engineers and antenna designers that match the impedance of the antennas to free space so that the maximum energy possible will leave the antenna and radiate away, as opposed to being reflected back into the antenna. A plane of metal material having a sheet resistance equal to half the impedance of air/vacuum/free space is placed in front of a beam of energy so that roughly half the energy in the beam is absorbed by the metal material composing the plane. This is essentially the same way the absorber layers work in this invention and provides a designer with a number to start with when fabricating the absorber layers. In reality, a number of empirical film structures are grown varying metal and dielectric thicknesses in a systematic way and the best results are used in fabrication.

Absorber layer 32 absorbs more than half of electromagnetic radiation a incident on it. The remainder passes of this radiation through this thin film layer to a first reflective side of metal reflector 35, (which has a thickness that is greater than 500Å) where it is reflected back toward the thin film. Upon passing again through the thin film, more than 50% of the reflected radiation is again absorbed in absorber layer 32. Between absorption in the thin film absorbtion layer and destructive interference due to the quarter wave thicknesses of the dielectrics, better than 99% of the incident energy can be absorbed in the thin film metal/dielectric stack. An exemplary structure for such imaging is $HfO_2$/Al/SiC/Al. It absorbs at 6328 Å, which is the HeNe laser line produced by a 2mWHeNe laser.

The heat energy produced by absorbing portion is mostly transmitted toward emitting portion 40. This enables an IR image to be produced by emitting portion 40.

An article by Hass, Schroeder, and Turner entitled, "Mirror Coatings for Low Visible and High Infrared Resistance," *Journal of the Optical Society of America,* Volume 46, No. 1, Jan., 1956, describes an absorbing structure that, at first glance resembles absorbing portion 30. The Hass structure absorbs visible radiation but reflects well in the infrared. Another related work by Bly and Cox entitled, "Infrared Absorber for Ferroelectric Detectors," *Applied Optics,* Volume 33, No. 1, Jan., 1994, relied on the principle of the Hass design to develop an absorber for the infrared region of the electromagnetic spectrum.

However, contrary to this invention, both Hass and Bly call for depositing the metal reflector on the substrate followed by a metal dielectric stack. The structures of the Hass and Bly articles are reversed as compared to transducer 20 of this invention since, as shown in FIG. 2 herein, dielectric layer 31 is deposited on the end of optical fiber 15 with an emitting surface in the form of reflector layer 35. By itself the emissivity of reflector layer 35 is extremely low and, therefore, the reflective layer does not represent a desirable emitting source of, for example, IR. This is the case even though thin-films with high emissivities in the IR band of interest are deposited, such as chemical vapor deposited Insb, for example, which produces only moderate improvements.

Kirchoff's Law assures us that a good absorber will also be a good emitter. Therefore, in accordance with this invention, the visible absorption properties of the dark mirror described by Hass et al. and the IR absorbing properties of the Bly/Cox structure are modified and combined in the composite structure of transducer 50. Absorbing portion 30 of transducer 20 is designed to absorb at wavelengths characteristic of the source radiation, in this case, electromagnetic radiation 11. Emitting portion 40 of transducer 20 includes the structure on the second reflective side of metal reflector layer 35 and is farther removed from the array of optical fibers 15. Emitting portion 40 is designed to receive heat energy from absorbing portion 30 and convert it to emitted radiation in the desired band.

The thicknesses of dielectric layers in emitting portion 40 are odd-numbered multiples of quarter wavelengths of the radiation that will be emitted from emitting portion 40. Absorber layer 42 is fabricated to provide sheet resistance equal to half the impedance of air/vacuum/free/space for desired emitted radiation so that appropriate absorption and emission occurs.

Similarly, in the variation of the invention shown in FIG. 3, the thicknesses of dielectric layers in emitting portion 40*a* are odd-numbered multiples of quarter wavelengths of the radiation that will be emitted from emitting portion 40*a*. Absorber layers 46 and 48 are fabricated to provide sheet resistance equal to half the impedance of air/vacuum/free/space for the desired emitted radiation to assure the right absorption and emission.

In other words, absorbing portion 30 absorbs the incident electromagnetic radiation 11. Absorbing portion 30 converts the absorbed radiation to heat heat energy and transfers it to emitting portion 40 which emits radiation very nearly like a black body at the same temperature. The emissivity of emitting portion 40 can approach unity for a desired IR band, thereby, ensuring maximum radiation at the desired wavelengths for a given temperature. Variations in design of the optical thin-film cavity allow the emissivity of emitting portion 40 to be tailored for a number of bands. The entire structure can be designed for different sources and detectors that are spectrally broad or narrow.

Figure 4:
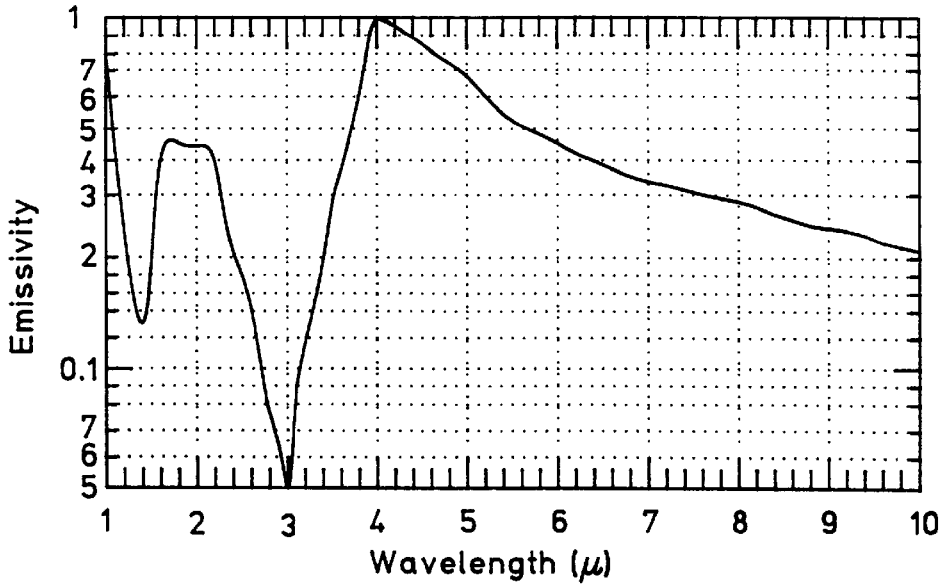
FIG. 4 is a predicted graph showing the emissivity of a three-layer thin-film emitter cavity optimized for the 3–5$\mu$ IR band.
Figure 5:
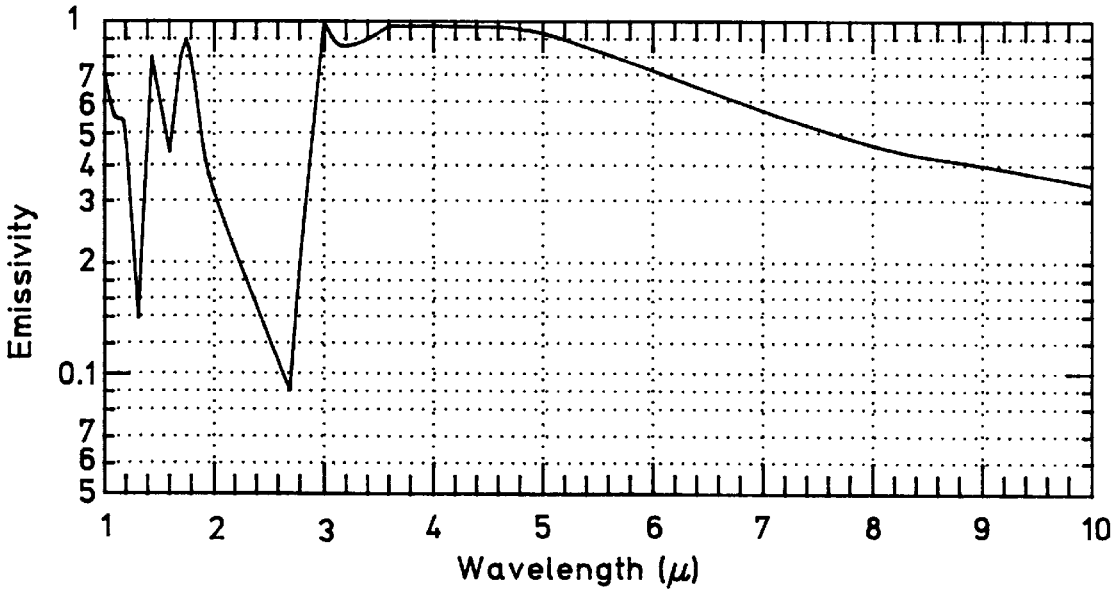
FIG. 5 is a predicted graph showing the emissivity for a five-layer thin-film emitter cavity optimized for the 3–5$\mu$ IR band.

Looking to FIG. 4, the graph shows a computer generated representation of the emissivity of the three-layer film emitter cavity of FIG. 2 that is optimized for the 3–5$\mu$ IR band. FIG. 5 depicts a computer generated representation of the emissivity of the five-layer thin-film emitter cavity of FIG. 3 that is optimized for the 3–5$\mu$ IR band.

Obviously, many other modifications and variations of the present invention are possible in the light of the above teachings. It is therefore to be understood that within the scope of the appended claims the invention may be practiced otherwise than as specifically described.

We claim:

1. A transducer comprising:

first dielectric layer to receive electromagnetic radiation, each layer having thickness equal to an odd-numbered multiple of quarter wavelengths of said radiation;

a reflector adjacent said layers to reflect portions of said radiation to said layers;

first film interposed between adjacent dielectric layers to absorb said received and said reflected radiation and to convert said absorbed radiation to heat energy;

second dielectric layers adjacent said reflector to receive said heat energy, each layer of said second dielectric layers having thickness equal to an odd-numbered multiple of quarter wavelengths of desired emitted radiation; and second film interposed between adjacent layers of said record dielectric layers to absorb said heat energy and to convert said absorbed heat energy to said emitted radiation.

2. A transducer according to claim 1 in which said first and second films have sheet resistance equal to half the electromagnetic impedance of free space for said electromagnetic radiation and said emitted radiation, respectively.

3. A transducer according to claim 2 whereby said electromagnetic radiation is comprised of at least one radiation from the group consisting of infrared light, visible light, and ultraviolet light, and said emitted radiation is infrared.

4. A transducer according to claim 3 whereby said electromagnetic radiation is transmitted to said first dielectric layers by total internal reflection.

5. A transducer according to claim 4 whereby said first dielectric layers are two dielectric layers.

6. A transducer according to claim 5 whereby said first film is a metal film.

7. A transducer according to claim 6 whereby said second dielectric layers are two dielectric layers.

8. A transducer according to claim 7 whereby said second film is a metal film.

9. A scene projector comprising:

a plurality of waveguides to transmit electromagnetic radiation, said plurality of waveguides having a separation between one another; and a plurality of transducers each disposed on an end of a separate one of said plurality of waveguides to absorb said electromagnetic radiation, to convert said absorbed radiation into heat energy, and to emit radiation having longer wavelengths than said electromagnetic radiation, each said transducer comprising:

first dielectric layer to receive electromagnetic radiation, each layer having thickness equal to an odd-numbered multiple of quarter wavelengths of said electromagnetic radiation;

a reflector adjacent said layers to reflect portions of said electromagnetic radiation to said layers;

first film interposed between adjacent dielectric layers to absorb said received and said reflected electromagnetic radiation and to convert said absorbed electromagnetic radiation to heat energy;

second dielectric layers adjacent said reflector to receive said heat energy, each layer of said second dielectric layers having thickness equal to an odd-numbered multiple of quarter wavelengths of desired emitted radiation; and second film interposed between adjacent layers of said record dielectric layers to absorb said heat energy and to convert said absorbed heat energy to said emitted radiation.

10. A transducer according to claim 9 whereby said plurality of waveguides are optical fibers that transmit said electromagnetic radiation by total internal reflection, and said emitted radiation is IR.

11. A transducer according to claim 10 whereby said first dielectric layers are two dielectric layers.

12. A transducer according to claim 11 whereby said first film is a metal film.

13. A transducer according to claim 12 whereby said second dielectric layers are two dielectric layers.

14. A transducer according to claim 13 whereby said second film is a metal film.

* * * * *